(12) United States Patent
Kozai et al.

(10) Patent No.: US 7,034,491 B2
(45) Date of Patent: Apr. 25, 2006

(54) NUMERICAL CONTROLLER

(75) Inventors: Haruhiko Kozai, Yamanashi (JP); Takahiko Endo, Kokubunji (JP); Eiji Genma, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/187,872

(22) Filed: Jul. 25, 2005

(65) Prior Publication Data
US 2006/0017415 A1 Jan. 26, 2006

(30) Foreign Application Priority Data
Jul. 26, 2004 (JP) ............... 2004/216934

(51) Int. Cl.
G05B 11/01 (2006.01)
G06F 15/46 (2006.01)

(52) U.S. Cl. ............... 318/570; 318/571; 318/630; 318/632

(58) Field of Classification Search ............. 318/568.1, 318/568.22, 567, 569, 630–638, 570–575, 318/560–566
See application file for complete search history.

(56) References Cited

U.S. PATENT DOCUMENTS

| | | | | |
|---|---|---|---|---|
| 5,059,881 A | * | 10/1991 | Fujita et al. ................ | 318/630 |
| 5,153,490 A | * | 10/1992 | Ueta et al. ................... | 318/571 |
| 5,367,238 A | * | 11/1994 | Sakamoto et al. .......... | 318/630 |
| 5,710,498 A | * | 1/1998 | Yutkowitz et al. .......... | 318/632 |
| 5,767,645 A | * | 6/1998 | Park .......................... | 318/560 |
| 6,252,368 B1 | * | 6/2001 | Sugie .................... | 318/568.22 |
| 6,437,534 B1 | * | 8/2002 | Kakino et al. .............. | 318/569 |
| 2001/0054876 A1 | | 12/2001 | Fujita et al. | |
| 2002/0151988 A1 | | 10/2002 | Shiba et al. | |
| 2004/0183495 A1 | * | 9/2004 | Iwashita et al. ............ | 318/638 |

FOREIGN PATENT DOCUMENTS

| EP | 0 077 655 | 4/1983 |
|---|---|---|
| EP | 0706852 | 4/1996 |
| JP | 58-068111 | 4/1983 |
| JP | 10154007 | 6/1998 |

* cited by examiner

Primary Examiner—Paul Ip
(74) Attorney, Agent, or Firm—Staas & Halsey LLP

(57) ABSTRACT

For outputting an amount of backlash compensation according to the direction of reversal in the reversal motion of the moving axis, three output modes are prepared: (a) a mode in which a preset backlash compensation is outputted all at once, (b) a mode in which backlash compensation is outputted according to distance traveled, and (c) a mode in which backlash compensation is outputted according to time elapsed. It is determined whether the motion of the moving axis has been changed from positive to negative directions or from negative to positive directions, and with this determination result, any one of the above three output modes (a) to (c) is selected.

5 Claims, 2 Drawing Sheets

NUMERICAL CONTROLLER

BACKGROUND OF THE INVENTION

1. Field of the Invention

The present invention relates to a numerical controller that has a backlash compensation function executed for moving axes such as feed axes in machine tools.

2. Description of the Prior Art

Moving axes such as feed axes in machine tools undergo lost motion due to backlash in ball screw/nut mechanisms, gear mechanisms, and other power transmission mechanisms when the direction of motion is reversed. In view of this situation, numerical controllers for controlling machine tools are provided with backlash compensation functions to compensate for the lost motion. These backlash compensation functions output a preset amount of backlash compensation when the direction of motion of an axis is reversed, using one of the following output modes:

(a) outputting a preset compensation all at once when the direction is reversed;
(b) outputting a compensation in amounts according to the distance traveled from the start of the direction reversal;
(c) outputting a compensation in amounts according to the time elapsed from the start of the direction reversal.

If a large backlash compensation is outputted all at once, mechanical vibration may occur or the machine tool may bite into the workpiece being machined. Two of the modes above prevent these problems by dividing the backlash compensation into parts that are outputted according to the distance traveled or time elapsed from the start of the direction reversal, instead of outputting the backlash compensation all at once.

In backlash compensation, one output mode is usually set in advance and used consistently. To increase the machining accuracy of machine tools controlled by numerical controllers, however, two backlash compensation modes may be provided and used selectively as necessary to compensate for backlash. In this connection, Japanese Patent Application Laid-Open No. 58-68111 discloses a method having a first backlash compensation mode in which backlash compensation is performed before the start of cutting according to the next block command after the completion of cutting according to the current block command, and a second backlash compensation mode in which backlash compensation is performed simultaneously with the start of cutting according to the next block command after the completion of cutting according to the current block command.

SUMMARY OF THE INVENTION

Machine tools controlled by numerical controllers use one of the three backlash compensation output modes (a) to (c) described above in their backlash compensation function. However, there has been no technology for selecting an arbitrary one of these backlash compensation output modes according to the direction of reversal of the motion of an axis. With the technology described in the above patent document (Japanese unexamined patent publication S58-68111) as well, one of the two backlash compensation modes is selected and specified to increase machining accuracy, but it is not selected according to the direction of reversal.

When gravity affects the motion of a machine tool axis because, for example, the axis moves in the vertical direction, in which the weight of the axis acts, or moves in a slanted direction, not perpendicular to the direction of gravity (not the horizontal direction), or when a load acts constantly in a predetermined direction on a moving axis, the backlash that occurs in the power transmission mechanism between the driving source and moving axis differs according to the direction of reversal.

According to the present invention, there is provided a numerical controller that can compensate for backlash correctly even when backlash occurs differently depending on the direction of reversal in the reversal motion of a moving axis.

The numerical controller according to the present invention has a backlash compensation function that outputs backlash compensation to a position control section to compensate for backlash that occurs when the direction of motion for a moving axis is reversed. This numerical controller comprises: setting means for setting output modes for outputting backlash compensation to the position control section, which correspond to directions of reversal in the reversal motion of the moving axis; and determining means for determining a direction of reversal in the reversal motion of the moving axis; and backlash compensation output means for outputting the backlash compensation to the position control section by using the output mode corresponding to the direction of reversal determined by the determining means, thereby allowing a backlash compensation output mode to be selected according to the direction of reversal in the reversal motion of the moving axis.

The output mode may include (a) mode in which the backlash compensation is outputted all at once when the direction of motion is reversed, (b) mode in which the backlash compensation is outputted according to distance traveled from the position where the direction of motion is reversed, and (c) a mode in which the backlash compensation is outputted according to a time elapsed from the time when the direction of motion is reversed.

In case of the above (b) and (c), the amounts of backlash compensation to be outputted every distribution cycle may be individually set depending on the direction of reversal, from positive to negative directions or from negative to positive directions.

According to the present invention, the backlash compensation output mode can be selected and set according to the direction in which the motion of a moving axis in a machine tool is reversed, achieving optimum backlash compensation when different backlash is caused by reversal in different directions due to, for example, action of the force of gravity on the moving axis. The machining precision of the machine tool can therefore be increased.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
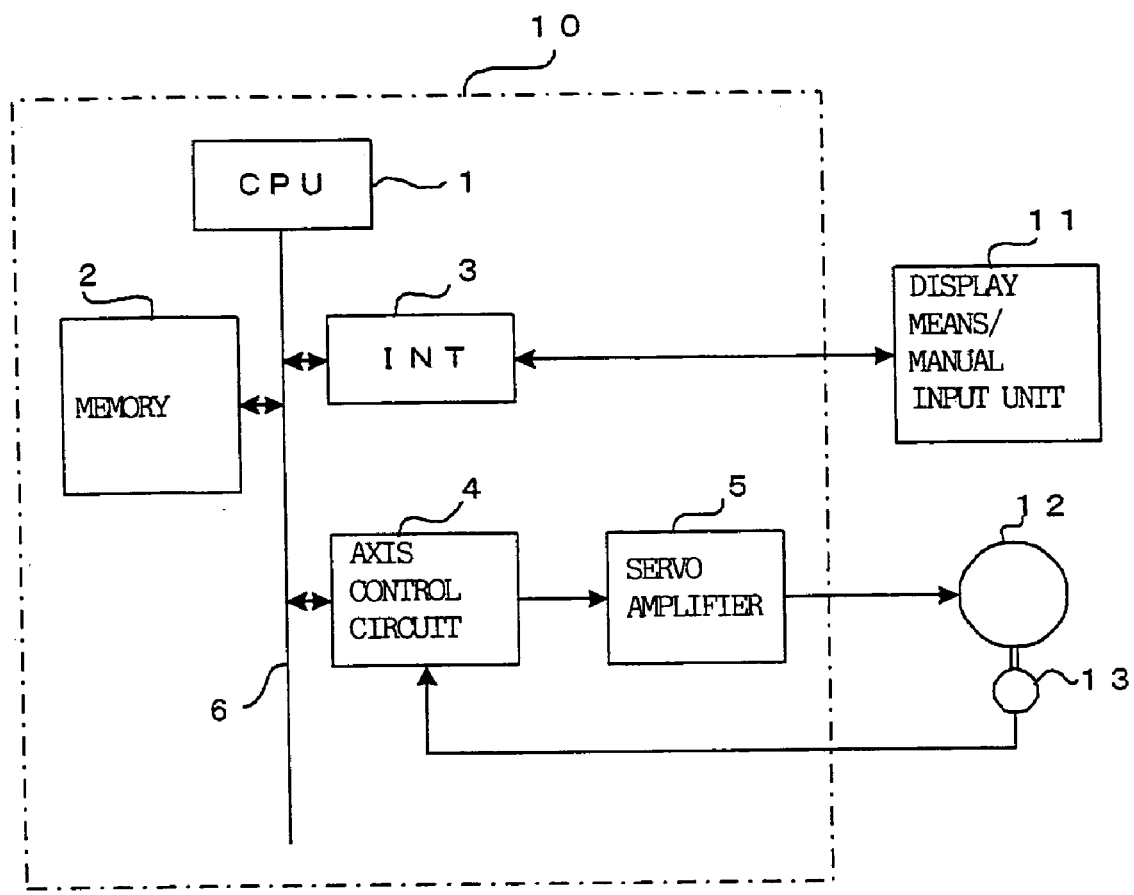
FIG. 1 is a block diagram indicating the main elements of a numerical controller which embodies the present invention.

As shown in FIG. 1, a memory 2, an interface 3, and an axis control circuit 4 for each moving axis are connected to the processor 1 in the numerical controller 10 through a bus 6. A display means/manual input unit 11 is connected to the bus 6 through the interface 3. A programmable controller, a spindle control circuit, and the like are also connected to the bus 6. These elements are not related directly to the present invention, so they are not shown in FIG. 1.

The memory 2 includes components such as ROM, RAM, and non-volatile RAM. The ROM stores a system program according to which the processor 1 controls the entire numerical controller. The RAM stores information such as a machining program used to control the machine tool connected to the numerical controller 10 so that machining is performed. The non-volatile RAM stores machining programs, parameter settings, and other settings and information.

The display means/manual input unit 11 includes a display unit comprising a CRT or liquid crystal display and manual input means comprising a keyboard and a pointing device or the like for input of settings and various data items.

Each axis control circuit 4 controls the driving of a servo motor 12 for a moving axis such as feed axis in the machine tool. The axis control circuit 4 comprises a processor, memory facilities such as a ROM and RAM, an input/output circuit, and other elements. The axis control circuit 4 controls the driving of the servo motor 12 through a servo amplifier 5. The axis control circuit 4 comprises a position control section that performs a position loop control process according to motion commands outputted from the processor 1 and position feedback from a position/speed detecting circuit 13, mounted on the servo motor 12, that detects the position and speed thereof, a speed control section that performs a speed loop control process according to speed feedback from the position/speed detecting circuit 13, and a current control section that performs a current loop control process according to current feedback signals.

FIG. 1 shows a single axis control circuit 4, a single servo amplifier 5, a single servo motor 12, and a single position/speed detecting circuit, but it should be noted that these elements are provided for each moving axis (or each feed axis). However, a single axis control circuit 4 may control a plurality of moving axes (feed axes).

The above numerical controller 10 has the same structure as conventional numerical controllers, except that the non-volatile RAM in the memory 2 stores software that executes the backlash compensation function specific to the present invention.

When gravity affects the motion of an axis in a machine tool controlled by a numerical controller because, for example, the axis moves in the vertical direction, in which the weight of the axis acts, or moves in a direction angled to the direction (horizontal direction) perpendicular to the direction of the force of gravity, or when a force acts constantly in a predetermined direction on a moving axis, different backlash may occur in the power transmission mechanism between the driving source and the moving axis according to the direction of reversal.

To cope with this situation in which backlash occurs differently according to the direction of reversal, an embodiment of the present invention enables any optimum backlash compensation output mode to be selected from among the modes as described above in which a predetermined amount of backlash compensation is outputted all at once when the direction of motion of an axis is reversed, or backlash compensation is outputted according to distance traveled or time elapsed.

In this embodiment, any one of the above three backlash compensation output modes (a) to (c) is set for a positive to negative reversal and for a negative to positive reversal of sign (indicating direction) in a motion command sequence, respectively. These mode settings can be made for each axis by parameter entry from the display means/manual input unit 11.

Figure 2:
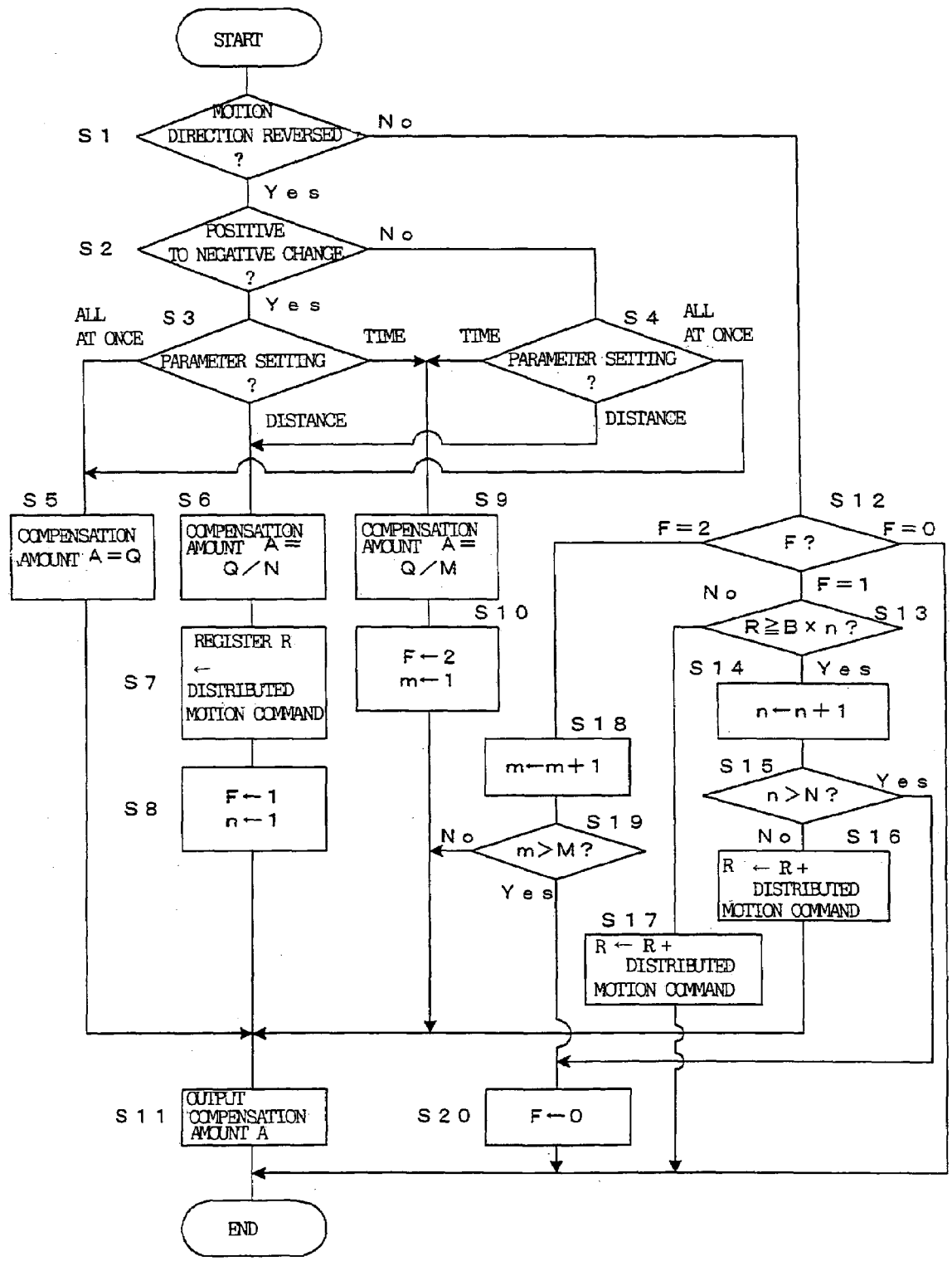
FIG. 2 is a flowchart illustrating the backlash compensation process performed by the numerical controller in FIG. 1 in each distribution cycle.

FIG. 2 is a flowchart illustrating how the processor 1 in the numerical controller 10 in this embodiment executes the backlash compensation function. The processor 1 controls the machine tool connected to the numerical controller 10 according to the machining program stored in the memory 2. The processor distributes motion commands to each of the moving axes (or feed axes) every distribution cycle, and executes the backlash compensation process shown in FIG. 2 every distribution cycle.

(1) First, it is determined whether there is a change in sign in the distributed motion command between the previous cycle and the current cycle (step S1). If the sign remains unchanged, implying that the axis is being commanded to continue moving in the same direction, the sequence proceeds from step S1 to step S12, where the setting of the flag F is checked. Since the flag F is set to 0 at power-up or at the start of machining, the process in the first distribution cycle terminates without output of backlash compensation. As long as the sign in the distributed motion command remains unchanged, the processing in steps S1 and S12 is executed and the process terminates, without outputting any backlash compensation.

If the sign in a distributed motion command is reversed (step S1), it is determined whether a positive sign in the previous cycle has changed to a negative sign in the current cycle, or a negative sign in the previous cycle has changed to a positive sign in the current cycle (step S2). For a positive to negative change in the sign in the distributed motion command, the parameter setting corresponding to this type of change (from positive to negative) is checked (step S3). For a negative to positive change in the sign in the distributed motion command, the parameter setting corresponding to this type of change (from negative to positive) is checked similarly (step S4).

(2-1) When it is determined in step S3 or S4 that the parameter setting indicates the mode for output of backlash compensation all at once (mode (a)):

The set backlash compensation amount Q is taken as the backlash compensation amount A in the current distribution cycle (step S5), which is outputted to the position control section in the axis control circuit 4 (step S11). The position control section in the axis control circuit 4 obtains a speed command by performing a position loop control process according to a motion command resulting from adding the backlash compensation to the distributed motion command in the distribution cycle and to the position feedback from the position/speed detecting circuit 13. The speed control section obtains a torque command (a current command) by performing a speed loop control process according to the speed command and the speed feedback from the position/speed detecting circuit 13. The current control section further obtains a command to the servo motor 12 by performing the current loop control process according to the torque command and the current feedback, and controls the driving of the servo motor via the servo amplifier 5.

(2-2) When it is determined in step S3 or S4 that the parameter setting indicates the mode for output of backlash compensation according to the distance traveled from the start of the reversal (mode (b)):

The set backlash compensation amount Q is divided by a set divisor N to calculate a divided backlash compensation amount A (=Q/N) (step S6). The amount of motion command for an axis in the current distribution cycle is stored in a register R to begin accumulation of the command motion (step S7). The flag F is then set to "1" and the index n is set to "1" (step S8), and the process proceeds to step S11, where the divided backlash compensation amount A obtained in step S6 is outputted to the axis control circuit 4.

If different divisors N are used for the positive to negative change of sign in the motion command and for the negative to positive change, the backlash compensation output in each distribution cycle may vary, depending on whether the reversal of motion is from the positive direction to the negative direction or from the negative direction to the positive direction.

For example, in the process for a positive to negative change of sign in the motion command (the process in step S3), the set backlash compensation amount Q may be divided by a divisor N1 set for reversal of motion from the positive direction to the negative direction so as to calculate the divided backlash compensation amount A (=Q/N1) in step S6. In the process for a negative to positive change of sign in the motion command (the process in step S4), the set backlash compensation amount Q may be divided by a divisor N2 ($\neq$ N1) set for reversal of motion from the negative direction to the positive direction so as to calculate the divided backlash compensation amount A (=Q/N2) in step S6.

The axis control circuit 4 adds the divided backlash compensation amount A to the motion command in the current distribution cycle, and drives the servo motor 12 through the position loop control process, speed loop control process, and current loop control process as described above.

(2-3) When it is determined in step S3 or S4 that the parameter setting indicates the mode for outputting backlash compensation according to the time elapsed from the start of the reversal (mode (c)):

The set backlash compensation amount Q is divided by a set divisor M to calculate a backlash compensation amount A (=Q/M) in each distribution cycle (step S9). The flag F is set to "2" and the index "m" is set to "1" (step S10). The sequence then proceeds to step S11, where the backlash compensation amount A for each distribution cycle, obtained in step S9, is outputted to the axis control circuit 4.

If different divisors M are used for the positive to negative change of sign in the motion command and for the negative to positive change, the backlash compensation output in each distribution cycle may vary, depending on whether the reversal of motion is from the positive direction to the negative direction or from the negative direction to the positive direction.

For example, in the process at a positive to negative change of sign in the motion command (the process in step S3), the set backlash compensation amount Q may be divided by a divisor M1 set for reversal of motion from the positive direction to the negative direction to calculate the divided backlash compensation amount A (=Q/M1) in step S9. In the process at a negative to positive change of sign in the motion command (the process in step S4), on the other hand, the set backlash compensation amount Q may be divided by a divisor M2 ( . M1) set for reversal of motion from the negative direction to the positive direction so as to calculate the divided backlash compensation amount A (=Q/M2) in step S6.

(3) In a distribution cycle after the output of compensation amount A in step S11, if it is determined in step S1 that the direction of motion has not been reversed, and if the value of the flag F is "0" in step S12, then the backlash compensation process in the current distribution cycle is terminated, by determining that output of the set backlash compensation amount Q has been completed in the current distribution cycle (by the process in step S20, described below), and.

(4-1) When the sequence has already proceeded to step S11 through steps S6, S7 and S8, and the flag F has been set to "1" in step S8:

After determined F=1 in step S12, whether or not the travel distance from the point of reversal of motion, stored in register R, is greater than or equal to the value (B×n) obtained by multiplying a set value B by the value of the index n is determined (step S13). If the distance in register R is less than (B×n), the amount of motion command in the current distribution cycle is added to the value in the register R to accumulate the commanded motion (step S17), terminating the backlash compensation process in the current distribution cycle.

The processing in steps S1, S12, S13, and S17 is then executed every distribution cycle until it is determined in step S13 that the amount of motion command accumulated in the register R is greater than or equal to the value (B×n) obtained by multiplying the set value B by the value of the index n. Then, the index n is incremented by one (step S14) and it is determined whether the index n exceeds the set value N indicating the number of divided outputs of backlash compensation (step S15). If the index n does not exceed the set value N, the amount of motion command in the current distribution cycle is added to the value in the register R to accumulate the amount of motion command (step S16). Then sequence proceeds to step S11, where the compensation amount A, obtained in step S6 as the backlash compensation, is outputted, terminating the process in the current distribution cycle.

After that, each time the accumulated distance increases by the set amount B, backlash compensation amount A is outputted, while the amount of distributed motion command is accumulated in the register R. When determined that the value of the index n has exceeded the set value N (step S15), the flag F is set to "0" (step S20), terminating the backlash compensation process in the current distribution cycle. After that, the processing in steps S1 and S12 is executed repeatedly as long as the direction of motion remains unchanged. In this manner as described above, divided backlash compensation is outputted according to the travel distance from the point of reversal of motion, so that the set amount of backlash compensation amount Q in total is outputted.

(4-2) When the sequence has already proceeded through steps S9, S10, and S11 and the flag F has been set to "2" in step S10:

After determined F=2 in step S12, the sequence proceeds to step S18, where the index m is incremented by one, and it is determined whether or not the index m exceeds the set value of M indicating the number of distribution cycles in which divided backlash compensation amount A is outputted (step S19). If the index m is not greater than the set value of M, the backlash compensation amount A obtained in step S9 is outputted (step S11). The processing in steps S1, S12, S18, S19, and S11 is then executed repeatedly until the index m exceeds the set value M.

When the index m exceeds the set value M, the sequence proceeds from step S19 to step S20, where the flag F is set to "0", terminating the backlash compensation process in the current distribution cycle. After that, the processing in steps S1 and S12 is executed repeatedly.

When the mode (output mode (c)) in which backlash compensation is outputted according to the time elapsed is selected, the divided backlash compensation amount A (=Q/M) is outputted every distribution cycle from the time when the direction of motion is reversed until the time the number of distribution cycles reaches the set value of M, so that the set amount of backlash compensation amount Q in total is outputted.

(5) In this embodiment, as described above, when the direction of motion of a moving axis is reversed, the mode of output of the backlash compensation amount Q is set selectively according to the direction of reversal, although the amount of backlash compensation amount Q is not changed, so that an optimum mode of output of the backlash compensation can therefore by selected according to the actual behavior of the moving axis.

In case where gravity acts on a moving axis, for example, machining precision may be increased by selecting a mode in which backlash compensation is outputted according to the travel distance from a point at which the direction of motion is reversed, if the reverse of direction is from upward direction to downward direction, but by selecting a mode in which the backlash compensation is outputted all at once at a point at which motion reverses, if the reverse of motion is from downward direction to upward direction.

In the above embodiment, when a backlash compensation output mode is based on the distance traveled or the time elapsed, the backlash compensation amount A for each cycle is calculated from the set compensation amount Q in step S6 or step S9. However, the backlash compensation amount A for each cycle may be calculated in advance and stored. In this case, the processing in step S7 and step S9 becomes unnecessary.

In the above embodiment, a predetermined amount of backlash compensation (Q/N or Q/M) is outputted each time a movement of predetermined distance is performed from the point where the direction of motion of an axis is reversed or each time a predetermined time elapses from the time when the direction of motion is reversed. However, it is possible to change the amount of backlash compensation to be outputted every distribution cycle according to the distance traveled or time elapsed from the point where the direction of motion is reversed. In this case, a mathematical function may be used to determine the amount of backlash compensation to be output every distribution cycle. Alternatively, the backlash compensation to be outputted according to the distance traveled or the time elapsed from the point where the direction of motion reverses may be stored in advance and the stored backlash compensation may be read and output.

The invention claimed is:

1. A numerical controller having a backlash compensation function that outputs backlash compensation to a position control section to compensate for backlash that occurs when the direction of motion for a moving axis is reversed, the numerical controller comprising:
    setting means for setting output modes for outputting backlash compensation to the position control section, which correspond to directions of reversal in the reversal motion of the moving axis;
    determining means for determining a direction of reversal in the reversal motion of the moving axis; and
    backlash compensation output means for outputting the backlash compensation to the position control section by using the output mode corresponding to the direction of reversal determined by said determining means.

2. The numerical controller according to claim 1, wherein said output mode includes a mode in which the backlash compensation is outputted all at once when the direction of motion is reversed, a mode in which the backlash compensation is outputted according to distance traveled from the position where the direction of motion is reversed, or a mode in which the backlash compensation is outputted according to a time elapsed from the time when the direction of motion is reversed.

3. The numerical controller according to claim 1, wherein said output mode is a mode in which the backlash compensation is outputted according to distance traveled from the position where the direction of motion is reversed, and the amounts of backlash compensation to be outputted every distribution cycle are set individually depending on the direction of reversal.

4. The numerical controller according to claim 1, wherein said output mode is a mode in which the backlash compensation is outputted according to time elapsed from the time when the direction of motion is reversed, and the amounts of backlash compensation to be outputted every distribution cycle are set individually depending on the direction of reversal.

5. The numerical controller according to any one of claims 1 to 4, wherein the output mode is specified by a parameter setting.

* * * * *